US012390829B1

(12) United States Patent
Huang

(10) Patent No.: US 12,390,829 B1
(45) Date of Patent: Aug. 19, 2025

(54) PORTABLE LIQUID STORAGE DEVICE

(71) Applicant: Shenzhen Alltokee Technology Co., Ltd, Shenzhen (CN)

(72) Inventor: Minyi Huang, Guangdong (CN)

(73) Assignee: Shenzhen Alltokee Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/001,643

(22) Filed: Dec. 26, 2024

(30) Foreign Application Priority Data

Nov. 8, 2024 (CN) ......................... 202422726448.3

(51) Int. Cl.
*B05C 17/005* (2006.01)

(52) U.S. Cl.
CPC .. *B05C 17/00543* (2013.01); *B05C 17/00546* (2013.01)

(58) Field of Classification Search
CPC .................... B05C 17/00543; B05C 17/00546
USPC ............................ 222/146.5, 146.2; 219/386
See application file for complete search history.

(56) References Cited

U.S. PATENT DOCUMENTS 3,152,245 A * 10/1964 Litman ................ H05B 3/0076 219/405
3,459,335 A * 8/1969 Cohen ................ B05C 17/0054 219/230
3,896,973 A * 7/1975 Morgan ................ A47K 5/122 219/433
5,248,870 A * 9/1993 Redal ..................... H05B 3/009 211/74
5,310,084 A * 5/1994 Pittman ................... A61F 6/005 221/268
5,397,031 A * 3/1995 Jensen ................ A47J 36/2433 222/146.5
5,429,271 A * 7/1995 Porter ....................... A61L 9/03 239/34
5,700,991 A * 12/1997 Osbern .................... H05B 3/00 219/214
5,780,819 A * 7/1998 Fabrikant ............... A45D 44/00 219/535
5,786,573 A * 7/1998 Fabrikant ................. H05B 3/00 219/535
5,811,766 A * 9/1998 Fabrikant ............... A45D 27/00 219/535
5,931,342 A * 8/1999 Taylor ..................... F41B 11/62 219/535
6,204,485 B1 * 3/2001 Williams ................. H05B 3/00 219/432
6,417,498 B1 * 7/2002 Shields ................. A61M 5/445 219/521
6,433,316 B1 * 8/2002 Sigety ................. F27B 17/0083 219/400

(Continued)

*Primary Examiner* — Paul R Durand
*Assistant Examiner* — Michael J. Melaragno

(57) ABSTRACT

A portable liquid storage device includes a housing; a heating cylinder assembly mounted in the housing and including a heat-conducting cylinder being configured for accommodating a liquid therein and an electric-heating piece attached to an outer wall of the heat-conducting cylinder; and a battery and a circuit board mounted in the housing, the battery being electrically connected to the electric-heating piece through the circuit board, so as to supply electric power to make the electric-heating piece generate heat to warm up the liquid inside the heat-conducting cylinder.

20 Claims, 16 Drawing Sheets

(56) References Cited

U.S. PATENT DOCUMENTS

| | | | | |
|---|---|---|---|---|
| 6,444,956 | B1 * | 9/2002 | Witcher | F21V 33/00 219/386 |
| 6,528,766 | B1 * | 3/2003 | Parks | A47K 10/426 126/261 |
| 6,703,590 | B1 * | 3/2004 | Holley, Jr. | A47J 36/2433 126/265 |
| 6,911,010 | B2 * | 6/2005 | Dirks | A61H 15/02 601/72 |
| 7,158,717 | B2 * | 1/2007 | Young | A01K 63/065 219/521 |
| 7,910,860 | B2 * | 3/2011 | Irvin | A45D 34/00 219/202 |
| 8,510,984 | B2 * | 8/2013 | Burgeson | A01M 31/008 222/54 |
| 8,698,050 | B2 * | 4/2014 | Leonard | B05B 11/0002 219/535 |
| 8,785,819 | B2 * | 7/2014 | Madigan | A61H 19/00 600/38 |
| 2004/0111071 | A1 * | 6/2004 | Powers | A47K 5/122 604/310 |
| 2004/0217102 | A1 * | 11/2004 | Berger | A47J 36/2433 219/386 |
| 2007/0215634 | A1 * | 9/2007 | Levin | A61M 5/44 221/231 |
| 2007/0269251 | A1 * | 11/2007 | Skalitzky | B05B 11/0002 401/2 |
| 2009/0095774 | A1 * | 4/2009 | Domoy | A45D 40/26 222/212 |
| 2010/0084431 | A1 * | 4/2010 | Miller | B05C 17/00546 222/326 |
| 2012/0009002 | A1 * | 1/2012 | Lo | A46B 15/003 401/6 |
| 2013/0098862 | A1 * | 4/2013 | Yi | A47J 36/2433 215/11.2 |
| 2015/0265107 | A1 * | 9/2015 | Buckalter | A47K 5/122 222/113 |

* cited by examiner

PORTABLE LIQUID STORAGE DEVICE

CROSS-REFERENCE TO RELATED APPLICATIONS

This application claims priority to Chinese Patent Application No. 202422726448.3, filed on Nov. 8, 2024. The content of the aforementioned application, including any intervening amendments thereto, are incorporated herein by reference.

TECHNICAL FIELD

This application relates to the technical field of liquid storage devices, and in particular to a portable liquid storage device.

BACKGROUND

Containers are mainly used to store substances, such as liquids, gases, and etc. In daily life, common containers include gas cylinders, oil drums, water bottles, seasoning cans, and etc.

In the beauty, fitness, medical and other industries, oils, such as essential oils, lubricating oils and the like are often used. These products are usually stored in bottle like containers and are squeezed out during use. However, most existing containers do not have a heating function, so that the temperature of the oils when squeezed out of the containers is lower than body temperature. Before applying the oils to the human body, it is necessary to rub the oils hot by hands, otherwise it will make users feel uncomfortable and to some extent affect the effectiveness of use. Therefore, there are some inconveniences in the use of these products.

SUMMARY

An object of this application is to provide a portable liquid storage device that can heat the liquid contained therein to a preset temperature, making it more convenient to use and providing a better user experience.

In order to achieve the above object, an embodiment of this application provides a portable liquid storage device, including:

- a housing;
- a heating cylinder assembly mounted in the housing, including a heat-conducting cylinder being configured for accommodating a liquid therein and an electric-heating piece attached to an outer wall of the heat-conducting cylinder; and
- a battery and a circuit board mounted in the housing, the battery being electrically connected to the electric-heating piece through the circuit board, so as to supply electric power to make the electric-heating piece generate heat to warm up the liquid inside the heat-conducting cylinder.

Compared with the prior art, the above portable liquid storage device has the following advantages: by means of setting a flexible electric-heating piece onto an outer wall of the heat-conducting cylinder, the heat generated by the electric-heating piece can be transferred to the heat-conducting cylinder rapidly and efficiently to warm up the liquid inside the heat-conducting cylinder; further, heat-conducting fins may be provided inside the heat-conducting cylinder to transfer the heat to the liquid at the center of the heat-conducting cylinder, resulting in uniform heating of the liquid and better constant temperature effect; moreover, the battery is arranged inside the housing for supplying electric power and thus the device is portable. During use, the liquid with a preset temperature can be squeezed out from the device to the human body, which is convenient in use and comfortable for users.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the embodiments described below are a part of the embodiments of the present application, rather than the entire embodiments. Based on the embodiments of the present application, all other embodiments obtained by those skilled in the art without any creative efforts fall within the protection scope of the present application.

Figure 1:
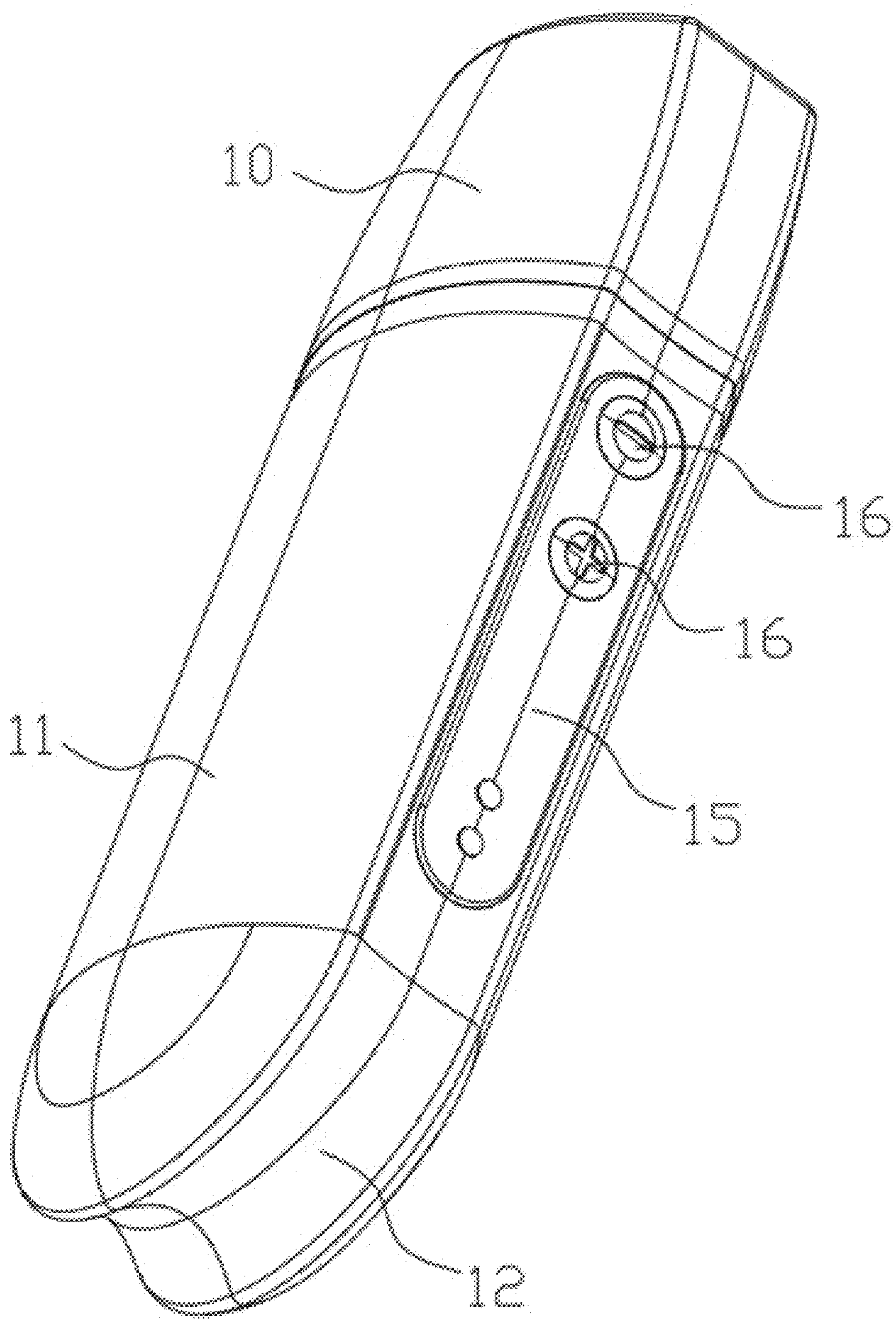
FIG. 1 is a schematic, assembled view of a portable liquid storage device according to an embodiment of the present application.
Figure 2:
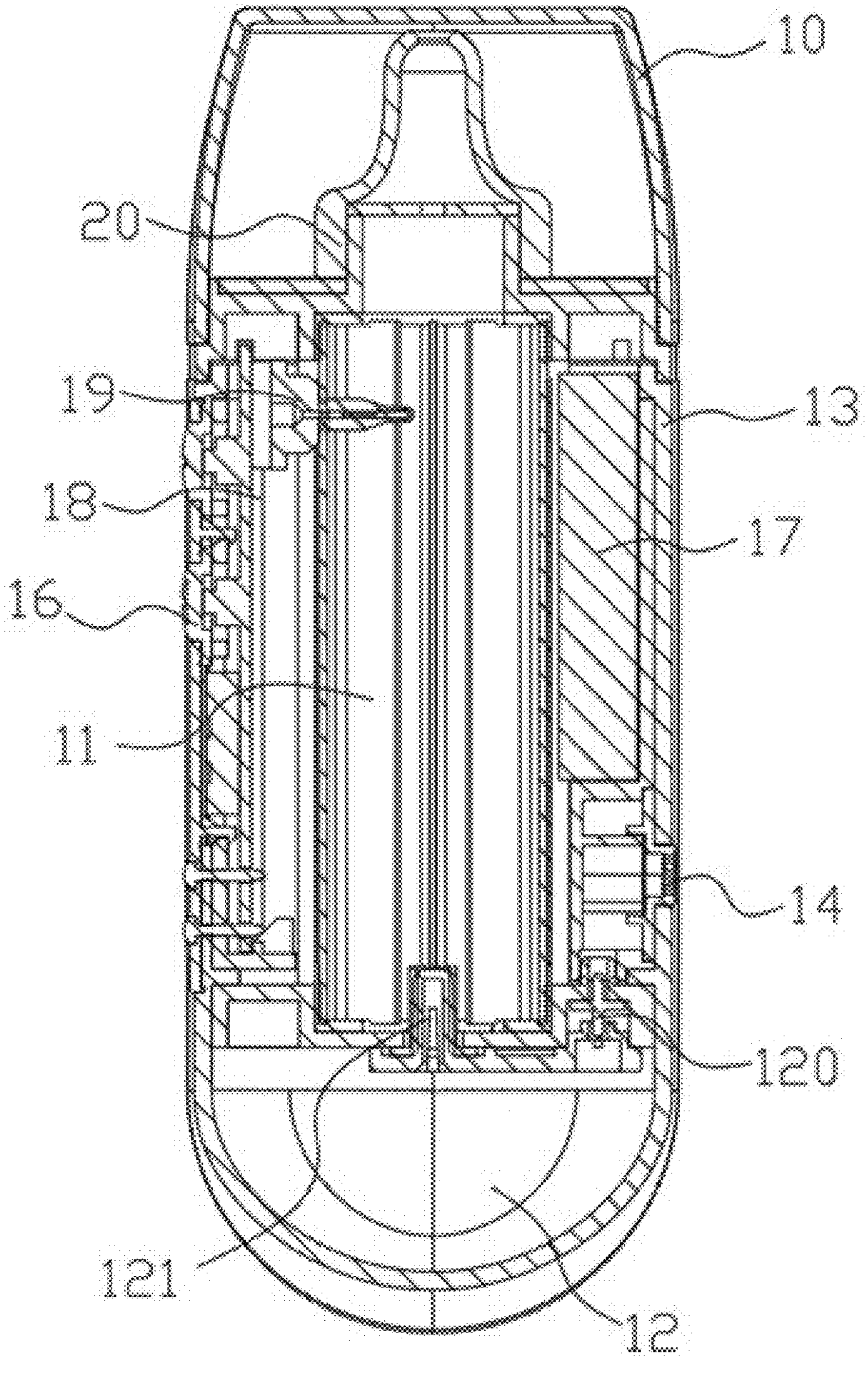
FIG. 2 is a cross sectional view of the portable liquid storage device of FIG. 1.
Figure 3:
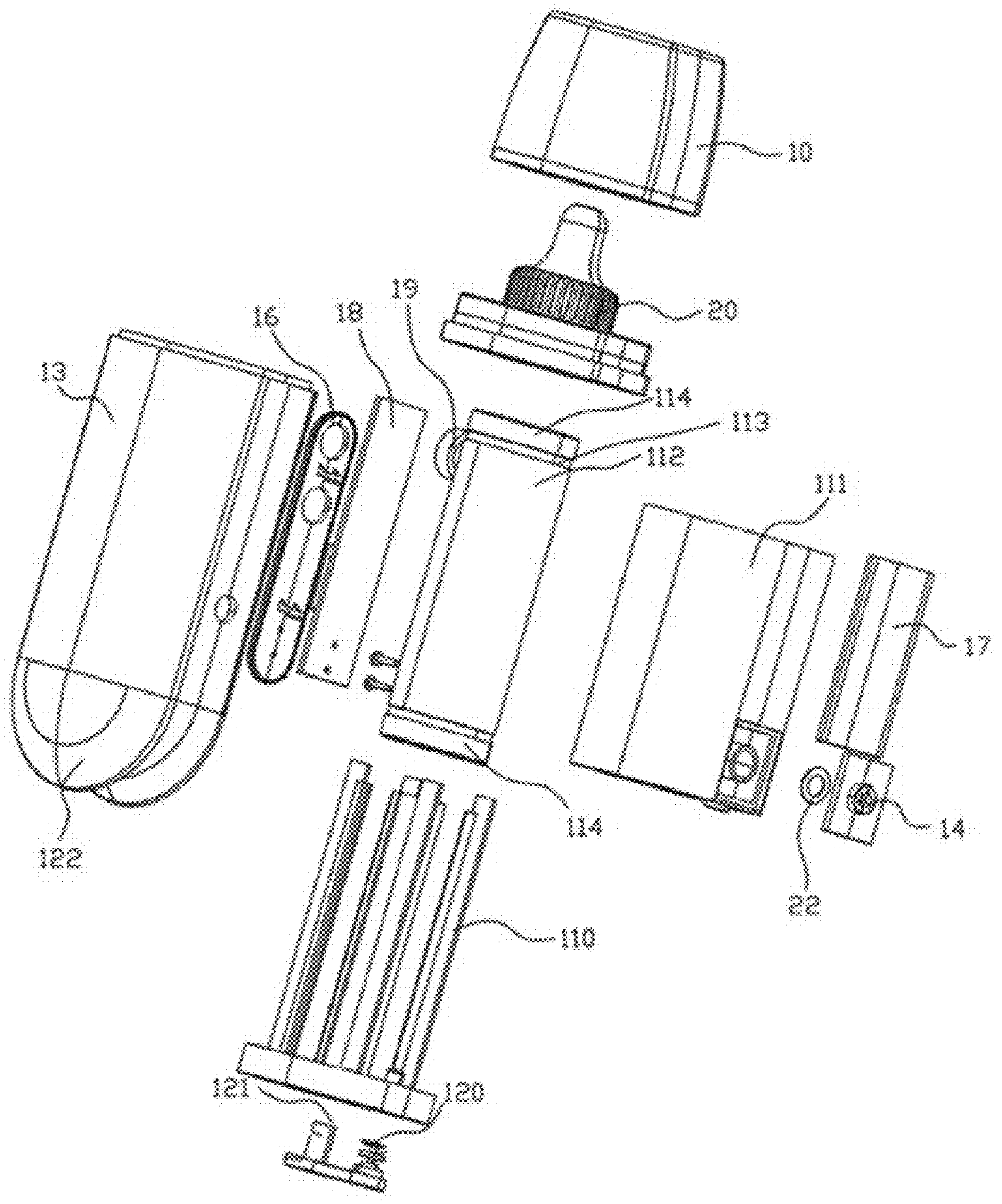
FIG. 3 is a schematic, exploded view of the portable liquid storage device of FIG. 1.

Referring to FIGS. 1-3, a portable liquid storage device according to an embodiment of the present application is shown. The portable liquid storage device includes a heating cylinder assembly 11 and an airbag assembly 12 arranged below the heating cylinder assembly 11. The airbag assembly 12 is connected to and communicated with the heating cylinder assembly 11, so that the liquid inside the heating cylinder assembly 11 can be squeezed out by squeezing the airbag assembly 12. In an embodiment, the liquid accommodated inside the heating cylinder assembly 11 may be lubricating oils, essential oils and the like, and the present portable liquid storage device may be used to provide oils at a preset temperature for adult products, such as masturbation cups, love eggs, dildos, and etc.

A mouth assembly 20 is arranged on and detachably connected to the heating cylinder assembly 11. When the mouth assembly 20 is disconnected to the heating cylinder assembly 11, the liquid can be injected into the heating cylinder assembly 11; and, when the mouth assembly 20 is connected to the heating cylinder assembly 11, the liquid inside the heating cylinder assembly 11 can be squeezed out. Thus, it is convenient for injecting liquid into and discharging liquid from the heating cylinder assembly 11. A soft shell 13, which may be made of silicone rubber, is mounted around the heating cylinder assembly 11. A cap 10 is covered on the mouth assembly 20 and coupled to the soft shell 13 to seal the mouth assembly 20. When the cap 10 is open, the liquid inside the heating cylinder assembly 11 can be squeezed out via the mouth assembly 20.

Figure 5:
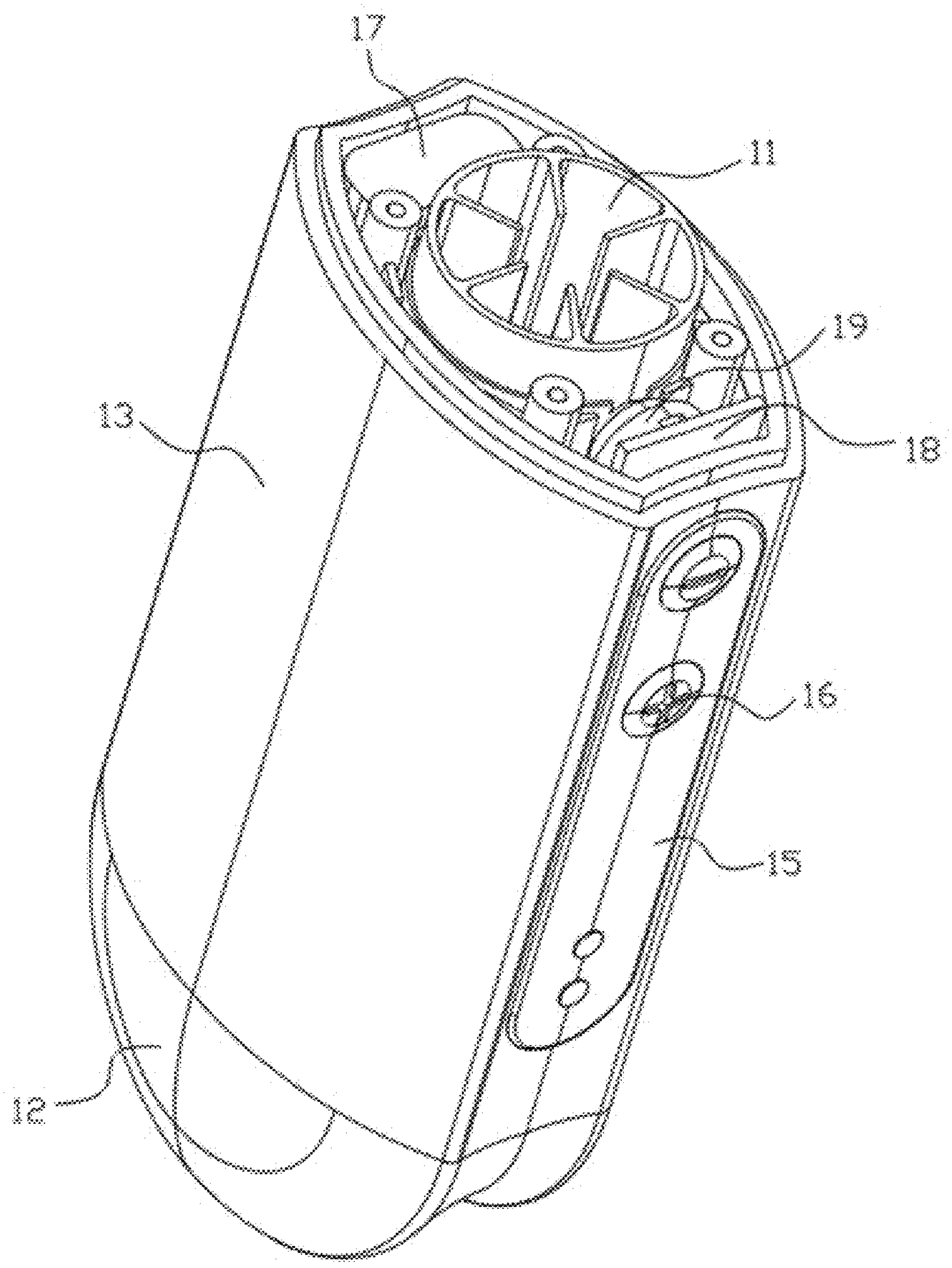
FIG. 5 is a schematic view of the portable liquid storage device of FIG. 1, wherein a bottle cap and a mouth assembly are removed.
Figure 6:
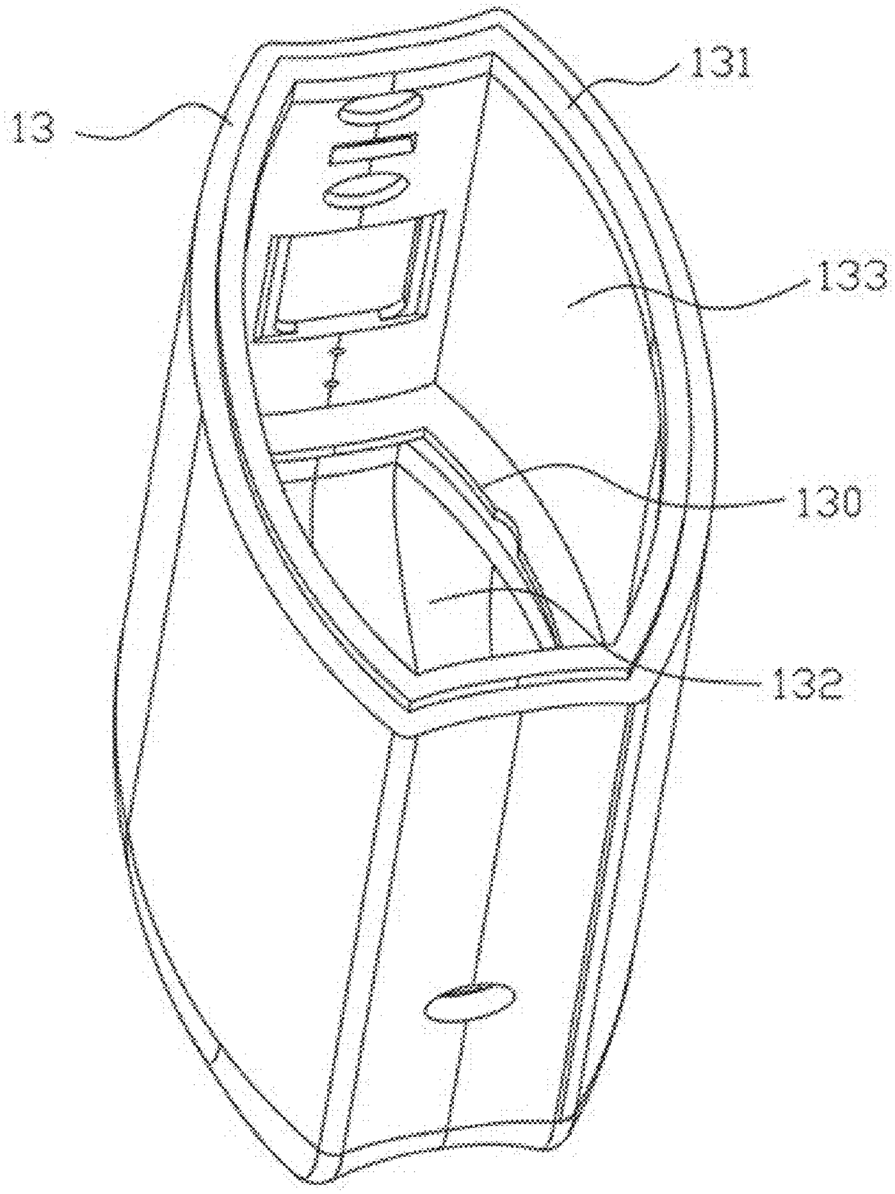
FIG. 6 is a schematic view of a soft shell of the portable liquid storage device of FIG. 1.
Figure 7:
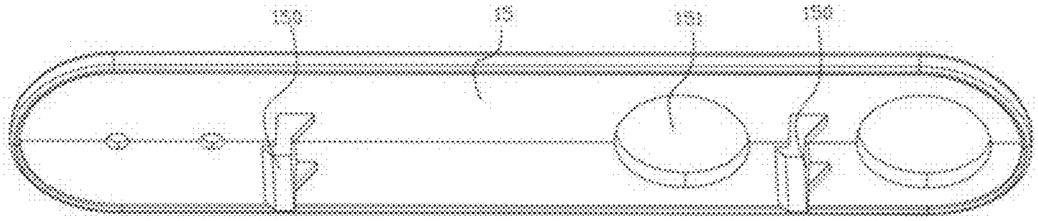
FIG. 7 is a schematic view of a key panel of the portable liquid storage device of FIG. 1.
Figure 8:
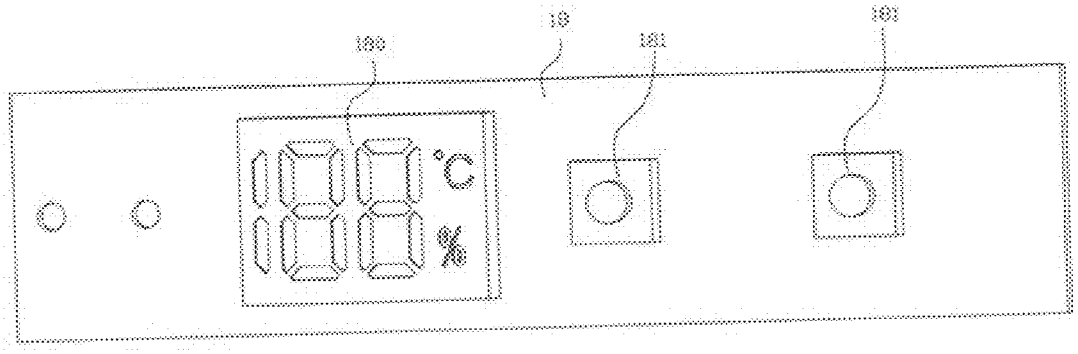
FIG. 8 is a schematic view of a circuit board of the portable liquid storage device of FIG. 1.

As shown in FIG. 3 and FIG. 5, the heating cylinder assembly 11 includes a heat-conducting cylinder 113 with top and bottom open ends. A sealing member 114, which may be made of soft rubber, is provided on each open end of the heat-conducting cylinder 113. Through holes are defined in the sealing members 114, wherein the through hole in the sealing member 114 at the bottom open end is communicated with the airbag assembly 12, allowing the liquid inside the heating cylinder assembly 11 to be squeezed through the airbag assembly 12. The through hole in the sealing member 114 at the top open end is communicated with the mouth assembly 20, so as to achieve the discharging of the liquid from the heating cylinder assembly 11.

The heating cylinder assembly 11 further includes a first sealing cover 110 coupled to the bottom open end of the heat-conducting cylinder 113. A flexible electric-heating piece 112 is mounted around and attached to an outer wall of the heat-conducting cylinder 113. A cylinder fixing sleeve 111 is mounted around and spaced from the heating cylinder assembly 11. A battery 17 and a circuit board 18 connected to the battery 17 are arranged inside the cylinder fixing sleeve 111, wherein the circuit board 18 is connected to the flexible electric-heating piece 112 electrically and controls the heat generation of the flexible electric-heating piece 112. The heat generated by the electric-heating piece 112 is transferred to the heat-conducting cylinder 113, so that the heated heat-conducting cylinder 113 can heat the liquid contained therein.

The soft shell 13 is covered on the cylinder fixing sleeve 111, and cooperatively the soft shell 13 and the cylinder fixing sleeve 111 form a housing of this portable liquid storage device. A lower portion of the soft shell 13 extending beyond the cylinder fixing sleeve 111 is configured as an airbag of the airbag assembly 12. Since the soft shell 13 is made of silicone rubber, the airbag is easy to deform when a force is applied thereon. Thus, when the user pinch the airbag with their hand, the air inside the airbag is squeezed out and flows into the heat-conducting cylinder 113, causing the liquid inside the heat-conducting cylinder 113 to be discharged through the mouth assembly 20.

Due to the battery 17 is arranged inside the present portable liquid storage device to supply electric power to the electric-heating piece 112, this device is portable and it is easy to achieve constant temperature of the liquid in the heat-conducting cylinder 113. A temperature measuring member 19, such as a temperature measuring probe, is provided at the top of the heat-conducting cylinder 113 and near a liquid discharge hole of the heat-conducting cylinder 113, so as to penetrate into the heat-conducting cylinder 113 to contact the liquid and thus detect the temperature of the liquid, wherein signals according to detected temperature are transmitted to the circuit board 18. The soft shell 13 is equipped with temperature control keys 16, wherein the temperature control keys 16 are arranged corresponding to the circuit board 18. By means of operating the temperature control keys 16, the circuit board 18 is controlled to adjust the heat generation of the flexible electric-heating piece 112, thereby adjusting the heating temperature of the liquid inside the heat-conducting cylinder 113.

The heat-conducting cylinder 113 may be configured as a hollow cylinder and made of heat-conducting materials, such as aluminum, iron, copper and the like, which can not only store liquids therein, but also transfer the heat of the flexible electric-heating piece 112 out of the heat-conducting cylinder 113 to the liquid inside the heat-conducting cylinder 113, thereby heating the liquid to a preset temperature, wherein the preset temperature is preferably close to the body temperature.

As shown in FIG. 5 to FIG. 8, a partition plate 130 is provided in a middle portion of the soft shell 13 to divide an interior space of the soft shell 13 into an airbag chamber 132 and a cylinder chamber 133. The airbag assembly 12 is at the airbag chamber 132, and the heating cylinder assembly 11 is arranged in the cylinder chamber 133. Sealing rings may be provided at two opposite sides of the partition plate 130 to prevent liquid from entering the airbag assembly 12. The cylinder fixing sleeve 111 is arranged around the heating cylinder assembly 11, wherein top and bottom ends of the cylinder fixing sleeve 111 are open. A support seat 1112 is provided at the bottom end of the cylinder fixing sleeve 111, and the battery 17 is supported by the support seat 1112. A position of the battery 17 is raised by the support seat 1112, so as to prevent liquid flowing into the cylinder fixing sleeve 111 from coming into contact with the battery 17 and thus causing malfunctions. Further, a support seat may be arranged corresponding to the circuit board 18.

In this embodiment, an inner wall of the cylinder fixing sleeve 111 is provided with a first step 1110, and the circuit board 18 is placed at the first step 1110. A notch is defined in the cylinder fixing sleeve 111 for exposing the circuit board 18. A portion of the soft shell 13 corresponding to the notch is provided with a key panel 15, and a clip 150 is provided on the key panel 15. By means of engagement of the clip 150 with the cylinder fixing sleeve 111 at a periphery of the notch, the key panel 15 is detachably connected to the cylinder fixing sleeve 111, improving the appearance of the present portable liquid storage device. Circular holes 151, corresponding to the temperature control keys 16, are defined in the key panel 15. Keys 181, corresponding to the circular holes 151, are provided on the circuit board 18, wherein the keys 181 correspond to the temperature control keys 16. Digital display tubes 180 are set in a middle portion of the circuit board 18, and the key panel 15 is transparent. The battery level and detected liquid temperature may be displayed through the digital display tubes 180, so that the liquid temperature and remaining battery level can be seen intuitively.

As shown in FIG. 9 to FIG. 13, the first sealing cover 110 includes a support base 1100 with a recessed cavity 1104 defined in a middle portion thereof. The bottom end of the heat-conducting cylinder 113 is fixed in the recessed cavity 1104, and a plurality of locking columns 1101 extend upwardly from an upper side of the support base 1100. Each locking column 1101 is provided with two reinforcing plates 1102 on two opposite sides thereof, respectively. Do to the fact that the locking columns 1101 need to be longer, the setting of the reinforcing plates 1102 can increase the strength of the locking columns 1101. The locking columns 1101 cooperatively form a mounting space 1103 for receiving the heat-conducting cylinder 113. A gap is formed between the reinforcing plates 1102 of adjacent locking columns 1101, so as to facilitate the installation of the heat-conducting cylinder 113 into the mounting space 1103. The reinforcing plates 1102 fix the heat-conducting cylinder 113 into the mounting space 1103. A through hole 1105 in defined in a middle portion of the recessed cavity 1104 of the support base 1100, intercommunicating the heat-conducting cylinder 113 with the airbag. The airbag assembly 12 supplies air to the heat-conducting cylinder 113 via the through hole 1105, thereby discharging the liquid inside the heat-conducting cylinder 113.

Figure 13:
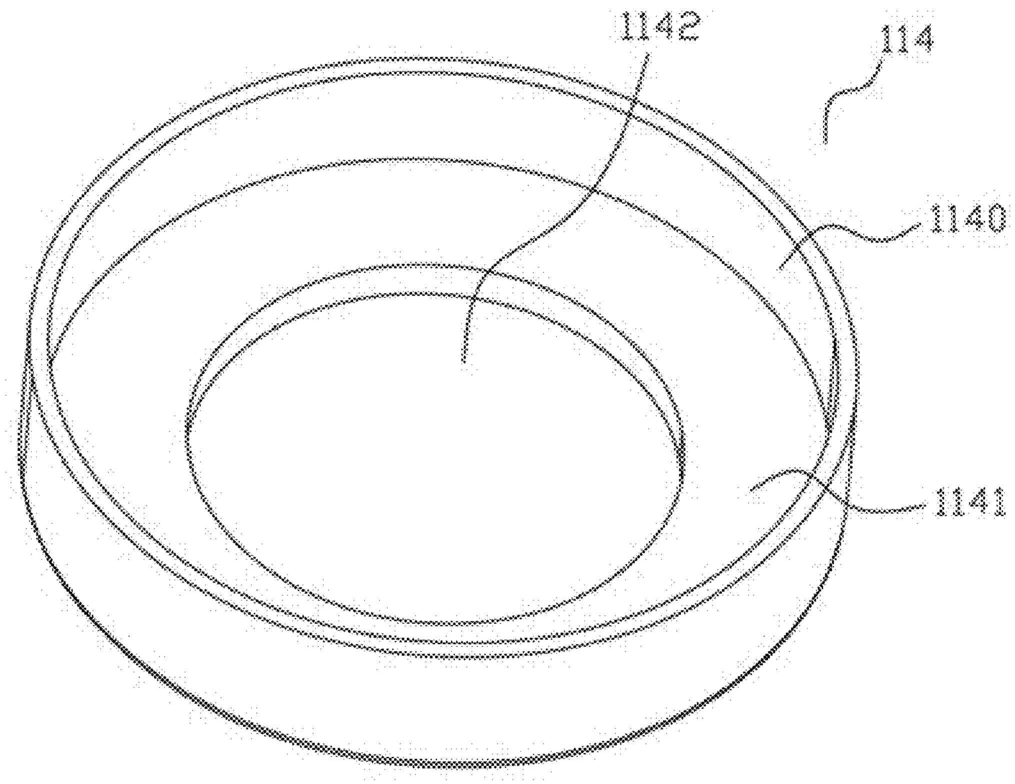
FIG. 13 is a schematic view of a sealing member of the portable liquid storage device of FIG. 1.

The heat-conducting cylinder 113 may be open at its top and bottom ends, and sealing members 114 are mounted to the open ends of the heat-conducting cylinder 113. Referring to FIG. 13, each sealing member 114 includes a side wall 1140 and a bottom wall 1141 integrated formed with the side wall 1140 as one piece. The bottom wall 1141 defines a circular hole 1142 therein, and the side wall 1140 is attached to an outer wall of a corresponding open end of the heat-conducting cylinder 113. The bottom walls of the sealing members 114 seal the top and bottom open ends of the heat-conducting cylinder 113, and air intake and liquid discharge are allowed for the heat-conducting cylinder 113 through the circular holes 1142 in the bottom walls 1141. A silicone fixing member at the bottom end of the heat-conducting cylinder 113 may be arranged in the recessed cavity 1104 to provide a certain support for the heat-conducting cylinder 113, while the recessed cavity 1104 increases the sealing performance of the connection between the sealing member 114 and the heat-conducting cylinder 113. In order to prevent the first sealing cover 110 from shaking, limiting ribs 1113 may be provided inside the cylinder fixing sleeve 111. The limiting ribs 113 and the support seat 1112 cooperatively fix the first sealing cover 110 to prevent it from shaking.

Figure 11:
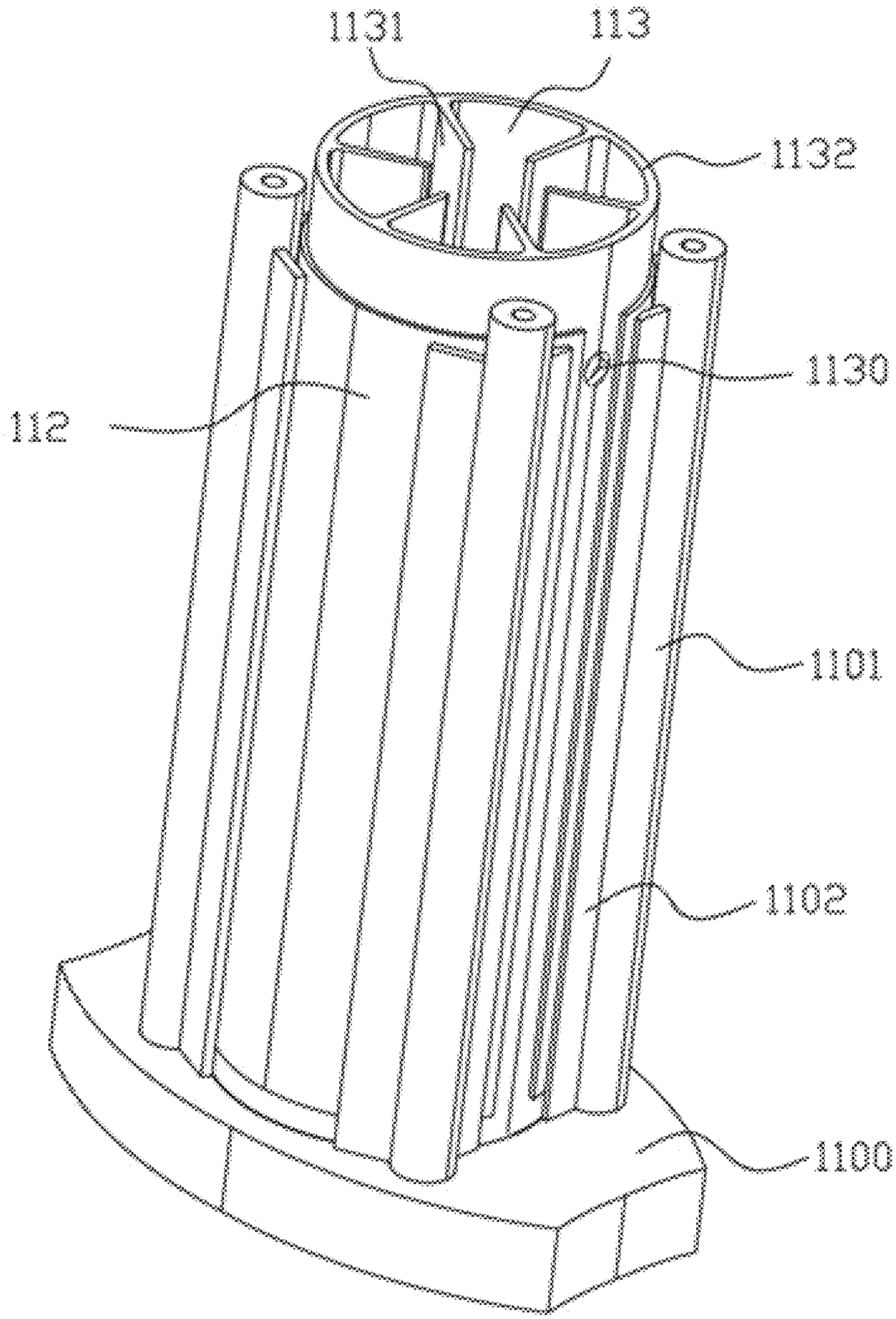
FIG. 11 is an assembled view of a first sealing cover and a heat-conducting cylinder of the portable liquid storage device of FIG. 1.

As shown in FIG. 11, in order to achieve uniform heating of the liquid inside the heat-conducting cylinder 113, a plurality of heat-conducting fins 1131 are provided inside the heat-conducting cylinder 113. The heat-conducting fins 1131 extend radially from an inner wall of the heat-conducting cylinder 113 towards the center, and the heat of the heat-conducting cylinder 113 can be transferred to the fins 1131 to warm up the liquid at the center of the heat-conducting cylinder 113 quickly and efficiently, resulting in more uniform heating of the liquid at each position inside the heat-conducting cylinder 113. The heat-conducting fins 1131 may extend straightly or curvedly. When the heat-conducting fins 1131 are configured in arc shape, it can further increase a heat-exchanging area thereof and thus provide better heating effect to the liquid at the center of the heat-conducting cylinder 113. Due to the presence of the flexible electric-heating piece 112, the liquid inside the heat-conducting cylinder 113 may always be in a preset temperature.

Figure 9:
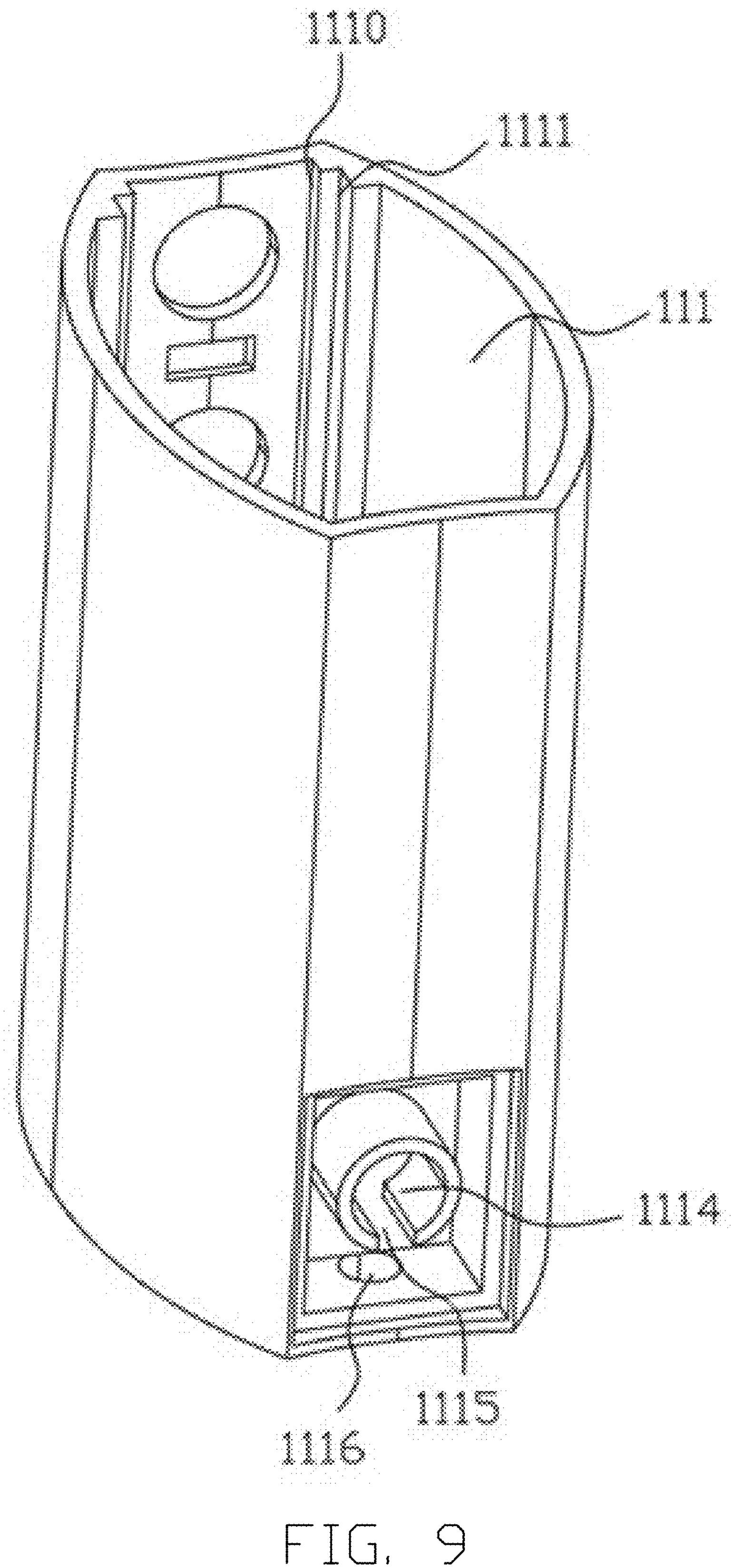
FIG. 9 is a schematic view of a cylinder fixing sleeve of the portable liquid storage device of FIG. 1.
Figure 10:
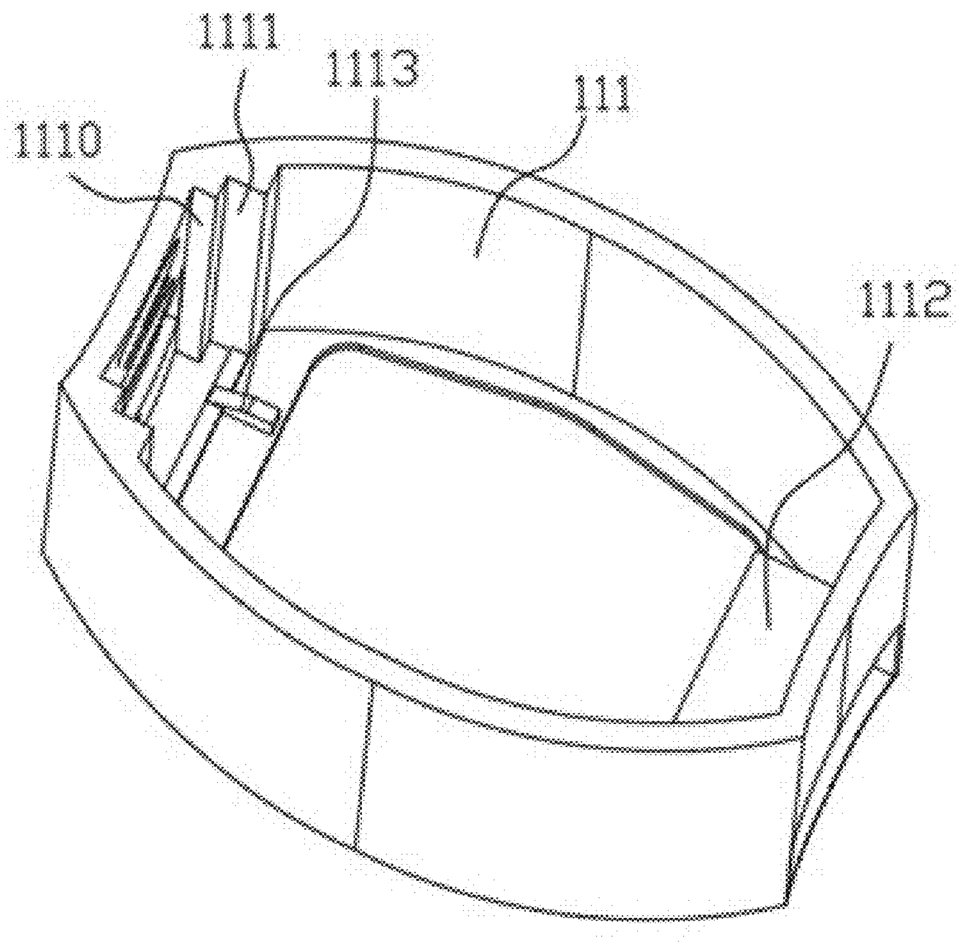
FIG. 10 shows the cylinder fixing sleeve from another aspect.

As shown in FIG. 9 to FIG. 10, a second step 1111 is provided on the inner wall of the cylinder fixing sleeve 111, which is located between the first step 1110 and the first sealing cover 110. A temperature measuring hole 1130 is provided on a top end side of the heat-conducting cylinder 113, and the temperature measuring member 19 is inserted into the heat-conducting cylinder 113 through the temperature measuring hole 1130 to measure the temperature of the liquid inside the heat-conducting cylinder 113. A part of the temperature measuring member 19 beyond the heat-conducting cylinder 113 is placed on the second step 111, and a force towards the heat-conducting cylinder 113 is applied on this part of the temperature measuring member 19 by the circuit board 18 to prevent it from loosening.

Figure 12:
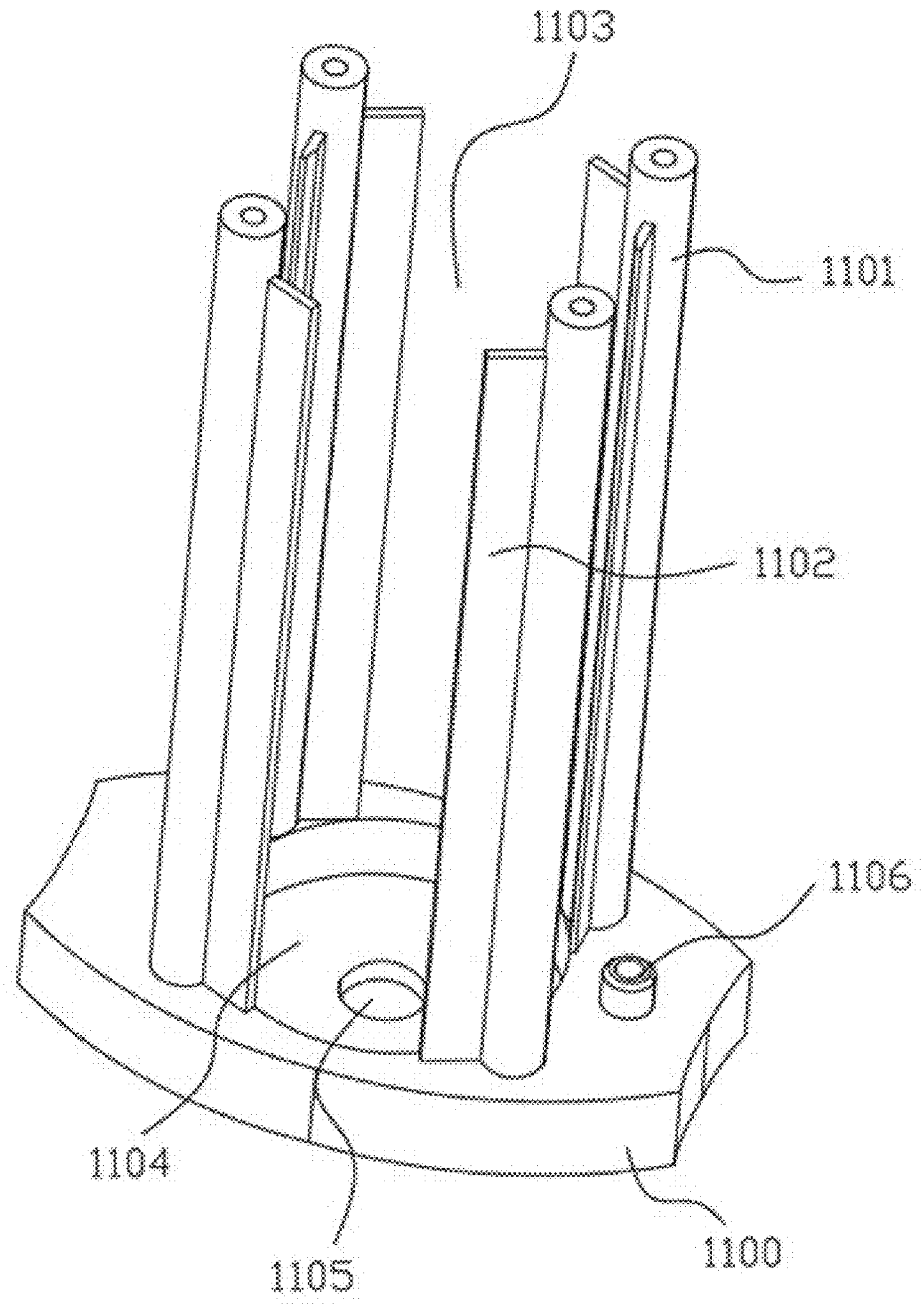
FIG. 12 is a schematic view of the first sealing cover of the portable liquid storage device of FIG. 1.

As shown in FIG. 2 and FIG. 3, an air inlet 120 and an air outlet 121 are defined in the airbag assembly 12, wherein the air outlet 131 is set corresponding to the through hole 1105 of the support base 1100, and the air inlet 120 is set corresponding to an air guide column 1106 (as shown in FIG. 12) provided on the first sealing cover 110. The air outlet 121 is connected to the bottom end of the heat-conducting cylinder 113, and a one-way valve may be provided between the airbag assembly 12 and the heat-conducting cylinder 113 to prevent the liquid in the heat-conducting cylinder 113 from flowing to the airbag. When the airbag is squeezed, air flows into the heat-conducting cylinder 113 through the one-way valve and pushes the liquid inside the heat-conducting cylinder 113 to the mouth assembly 20, thereby discharging the liquid for normal use.

As shown in FIG. 9 and FIG. 12, in order to facilitate the air intake of the airbag assembly 12, the air guide column 1106 is provided on the first sealing cover 110 and passes through a fixing hole 1116 of the cylinder fixing sleeve 111. A lateral fixing column 1114 is provided on a lateral side of the cylinder fixing sleeve 111. A waterproof and breathable film 22 is provided inside the lateral fixing column 1114, and an intake member 14 is provided outside the lateral fixing column 1114. A bottom end of the lateral fixing column 1114 is provided with an opening 1115, which corresponds to the fixing hole 1116 of the cylinder fixing sleeve 111. Air enters the intake member 14 and passes through the waterproof breathable film 22 into the lateral fixing column 1114, and then enters the air guide column 1106 via the opening 1115, and finally enters the airbag assembly 12, resulting in better intake effect.

Figure 4:
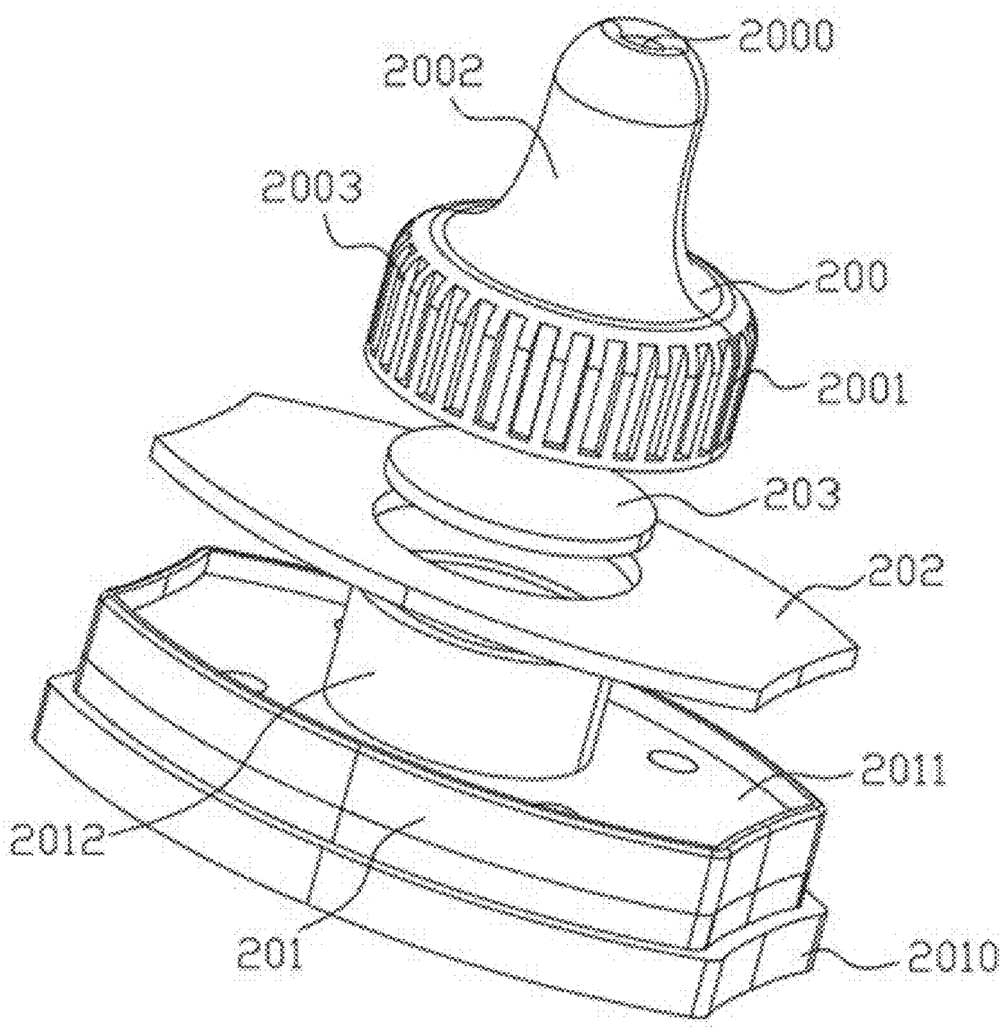
FIG. 4 is a further exploded view of a mouth assembly of the portable liquid storage device of FIG. 3.

As shown in FIG. 4, in order to facilitate the injection of liquid into the heat-conducting cylinder 113, the mouth assembly 20 is arranged above the heating cylinder assembly 11. The mouth assembly 20 includes a second sealing cover 201 coupled to the top end of the heat-conducting cylinder 113 and connected to the soft shell 13. Top ends of the locking columns 1101 of the first sealing cover 110 may be inserted into corresponding holes defined in the second sealing cover 201. Thus, the first sealing cover 110 and the second sealing cover 201 seal the top and bottom ends of the heat-conducting cylinder 113, respectively. The second sealing cover 201 is provided with a liquid injection hole 2012, which is communicated with the heat-conducting cylinder 113 for liquid injection. A bottle mouth 200 is detachably connected to the liquid injection hole 2012, and a liquid discharge hole 2000 is provided on the bottle mouth 200.

The liquid discharge hole 2000 corresponds to the liquid injection hole 2012, and liquid can be discharged through the liquid discharge hole 2000.

As shown in FIG. 4 and FIG. 5, a top end of the soft shell 13 is provided with an annular flange 131, which extends upwardly from an inner periphery of the soft shell 13. The second sealing cover 201 is provided with an annular protrusion 2010 corresponding to the flange 131. When the second sealing cover 201 is placed on the heating cylinder assembly 11, the annular protrusion 2010 surrounds the annulet flange 131, which can not only seal the top end of the heat-conducting cylinder 113, but also keep the outer face of the mouth assembly 20 and the outer face of the soft shell 13 in a flat state.

A recess 2011 is provided at a top of the second sealing cover 201, and a silicone pad 202 is installed inside the recess 2011. Screw holes in the recess 2011 may be sealed by the silicone pad 202, so as to prevent liquid from entering the heating cylinder assembly 11 through the screw holes and coming into contact with electronic components. An outer wall of a bottom end of the bottle mouth 200 is provided with longitudinal ribs 2001, which can increase the friction force when the bottle mouth 200 is rotated. The bottle mouth 200 is configured as a conical structure with a small top end and a large bottom end, wherein the liquid discharge hole 2000 is defined at the smaller top end to control the liquid output. A sealing gasket 203 is provided in the bottle mouth 200. When the device leaves the factory, the sealing gasket 203 seals the liquid injection hole 2012 at the top end of the second sealing cover 201, and the bottle mouth 200 is screwed on to the second sealing cover 201 and around the liquid injection hole 2012. When the device is in use, the bottle mouth 200 is open to remove the sealing gasket 203, so as to facilitate the injection of liquid into the heating cylinder assembly 11 and discharging of liquid from the heating cylinder assembly 11 for normal use.

Figure 14:
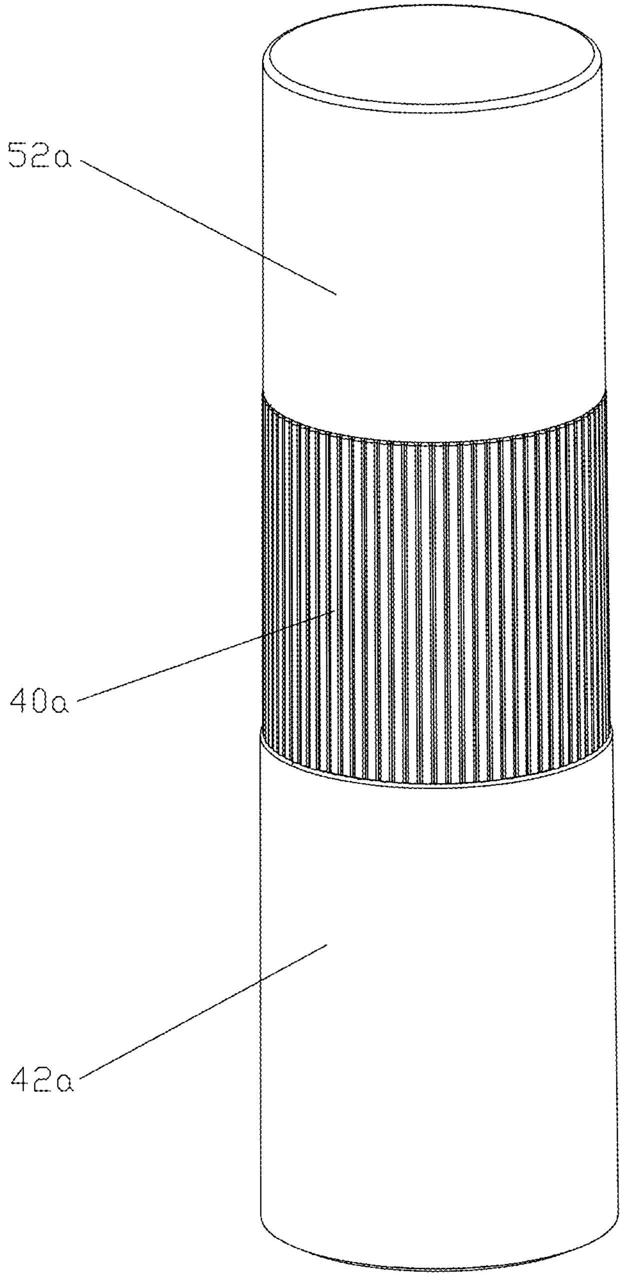
FIG. 14 is a schematic, assembled view of a portable liquid storage device according to a second embodiment of the present application.
Figure 15:
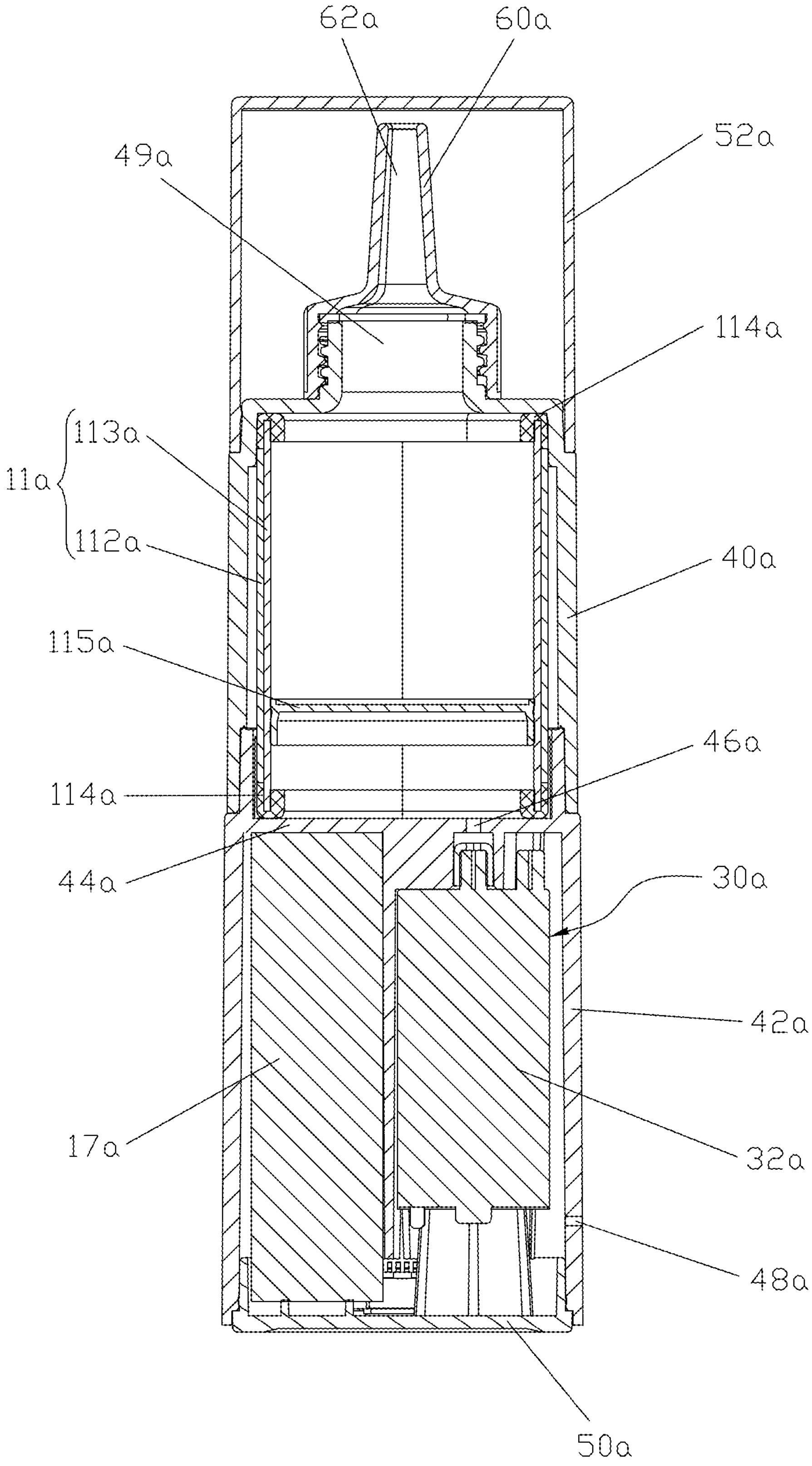
FIG. 15 is a cross sectional view of the portable liquid storage device of FIG. 14.

Referring to FIG. 14 and FIG. 15, a portable liquid storage device according to a second embodiment of the present application is shown. In this embodiment, the portable liquid storage device includes a heating cylinder assembly 11*a* and a pump assembly 30*a* connected to the heating cylinder assembly 11*a*.

The heating cylinder assembly 11*a* includes a cylindrical-shaped heat-conducting cylinder 113*a* for accommodating liquid therein and a flexible electric-heating piece 112*a* mounted around and attached to an outer wall of the heat-conducting cylinder 113*a*. A battery 17*a* is electrically connected to the flexible electric-heating piece 112*a* through a circuit board, so as to provide electric power to make the flexible electric-heating piece 112*a* generate heat to warm up the liquid inside the heat-conducting cylinder 113*a*. Similar to the previous embodiment, the heat-conducting cylinder 113*a* is configured with top and bottom open ends, and sealing members 114*a* are provided at each open end of the heat-conducting cylinder 113*a*.

In this embodiment, a piston plate 115*a* is slidably arranged in the heat-conducting cylinder 113*a*, and the pump assembly 30*a* is configured to push the piston plate 115*a* to move upwardly, which in turn push the liquid inside the heat-conducting cylinder 113*a* to move. Specifically, the pump assembly 30*a* includes an air pump 32*a* and pipelines for connecting the air pump 32*a* to the heat-conducting cylinder 113*a*. Generally, a solenoid valve may be provided between the air pump 32*a* and the circuit board to control the operation of the air pump 32*a*. During operation, the air pump 32*a* supply air into the bottom end of the heat-conducting cylinder 113*a* to push the piston plate 115*a* and the liquid to move towards the top end, resulting in discharging of the liquid.

In this embodiment, the heating cylinder assembly 11*a* is fixed inside a cylinder fixing sleeve 40*a*, and the pump assembly 30*a* is fixed inside a pump fixing sleeve 42*a*, wherein a bottom end of the cylinder fixing sleeve 40*a* is coupled to a top end of the pump fixing sleeve 42*a*. The cylinder fixing sleeve 40*a* and the pump fixing sleeve 42*a* cooperatively form a housing of the portable liquid storage device. In other embodiments, the cylinder fixing sleeve 40*a* and the pump fixing sleeve 42*a* may be formed integrally as one piece.

In this embodiment, the bottom end of the cylinder fixing sleeve 40*a* is configured to be open, facilitating assembly of the heating cylinder assembly 11*a* into the cylinder fixing sleeve 40*a*. A partition plate 44*a* may be provided at the top end of the pump fixing sleeve 42*a* to seal the bottom end of the heat-conducting cylinder 113*a*. The bottom end of the pump fixing sleeve 42*a* may be open and covered by a bottom cap 50*a*, facilitating assembly of the pump assembly 30*a* into the pump fixing sleeve 42*a*. In other embodiments, the partition plate 44*a* may be provided at the bottom end of the cylinder fixing sleeve 40*a*, which can seal the bottom end of the heat-conducting cylinder 113*a* too.

In this embodiment, an air outlet 46*a* may be defined in the partition plate 44*a* for interconnecting the air pump 32*a* to the heat-conducting cylinder 113*a*, and an air inlet 48*a* may be defined in the pump fixing sleeve 42*a* for connecting the air pump 32*a* to the outside. In other embodiments, the air inlet 48*a* may be defined in the bottom cap 50*a*. In other embodiments, the top end and/or bottom end of the heat-conducting cylinder 113*a* may be closed, and the air inlet 48*a* may be defined in the heat-conducting cylinder 113*a*.

As shown in FIG. 15, the top end of the cylinder fixing sleeve 40*a* is configured with a liquid injection hole 49*a* for inputting liquid into the heat-conducting cylinder 113*a*, and a bottle mouth 60*a* is coupled to the top end of the cylinder fixing sleeve 40*a* to cover the liquid injection hole 49*a*. In this embodiment, the bottle mouth 60*a* is screwed to the cylinder fixing sleeve 40*a*, and a liquid discharge hole 62*a* is defined in the bottle mouth 60*a* for discharging the liquid. The liquid discharge hole 62*a* is in communication with the liquid injection hole 49*a*.

Preferably, the liquid discharge hole 62*a* is much smaller than the liquid injection hole 49*a*. Thus, when the bottle mouth 60*a* is removed from the cylinder fixing sleeve 40*a*, the liquid can be quickly replenished into the heat-conducting cylinder 113*a* through the liquid injection hole 49*a*; when the bottle mouth 60*a* is screwed onto the cylinder fixing sleeve 40*a*, the liquid can be discharged from the heat-conducting cylinder 113*a* at an appropriate speed through the liquid discharge hole 62*a*. Similarly, a top cap 52*a* may be coupled onto the cylinder fixing sleeve 40*a* to cover the liquid discharge hole 62*a*.

In this embodiment, the discharge of liquid is controlled by the air pump 32*a*, which is more convenient and labor-saving compared to manually squeezing the airbag in the previous embodiment, and can accurately control the discharge amount of liquid. The discharged liquid is heated by the flexible electric-heating piece 112*a* to a predetermined temperature (which is generally close to or slightly higher than the body temperature), making it more comfortable to apply to the human body and enhancing the user experience.

Figure 16:
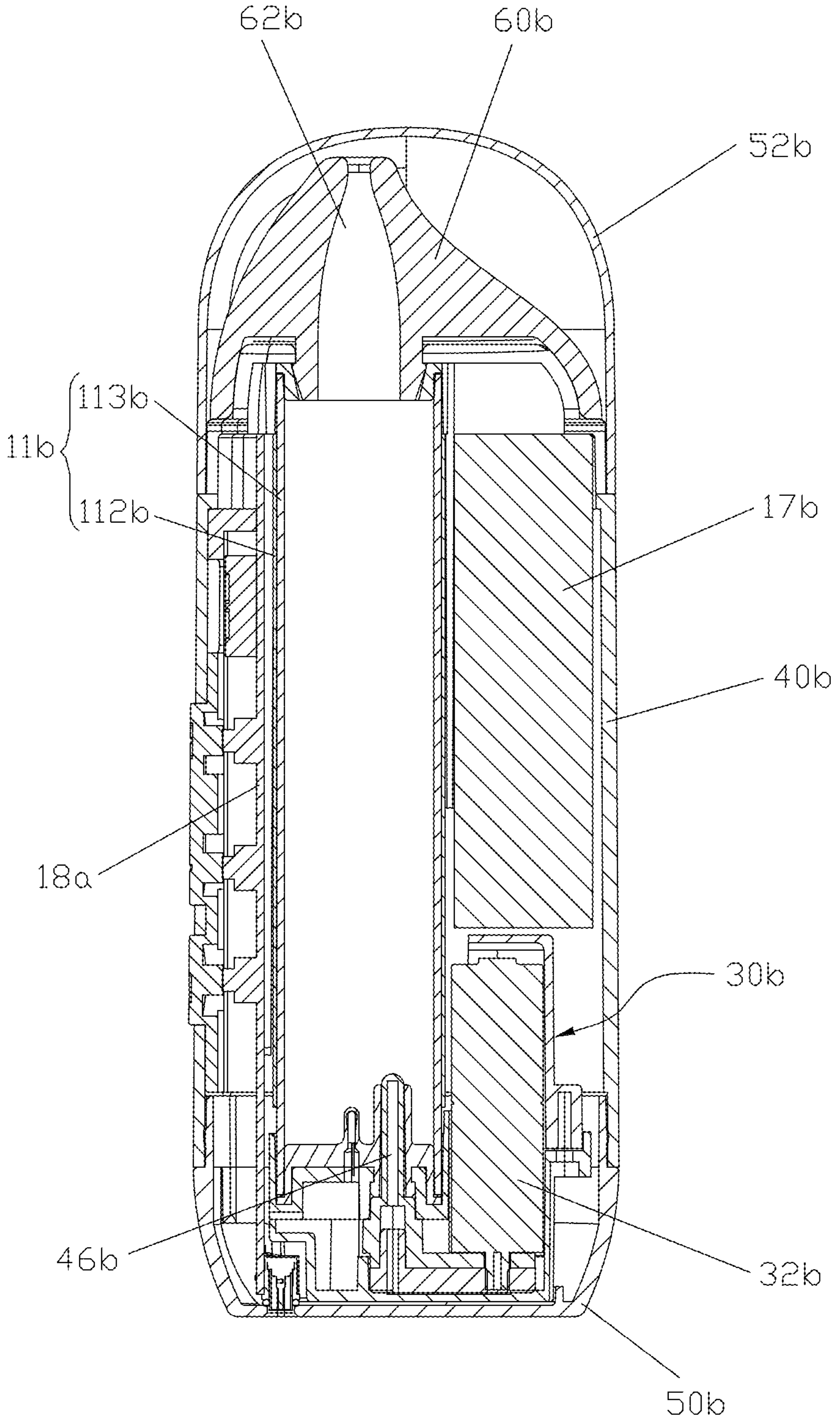
FIG. 16 is a schematic, assembled view of a portable liquid storage device according to a third embodiment of the present application.
Figure 17:
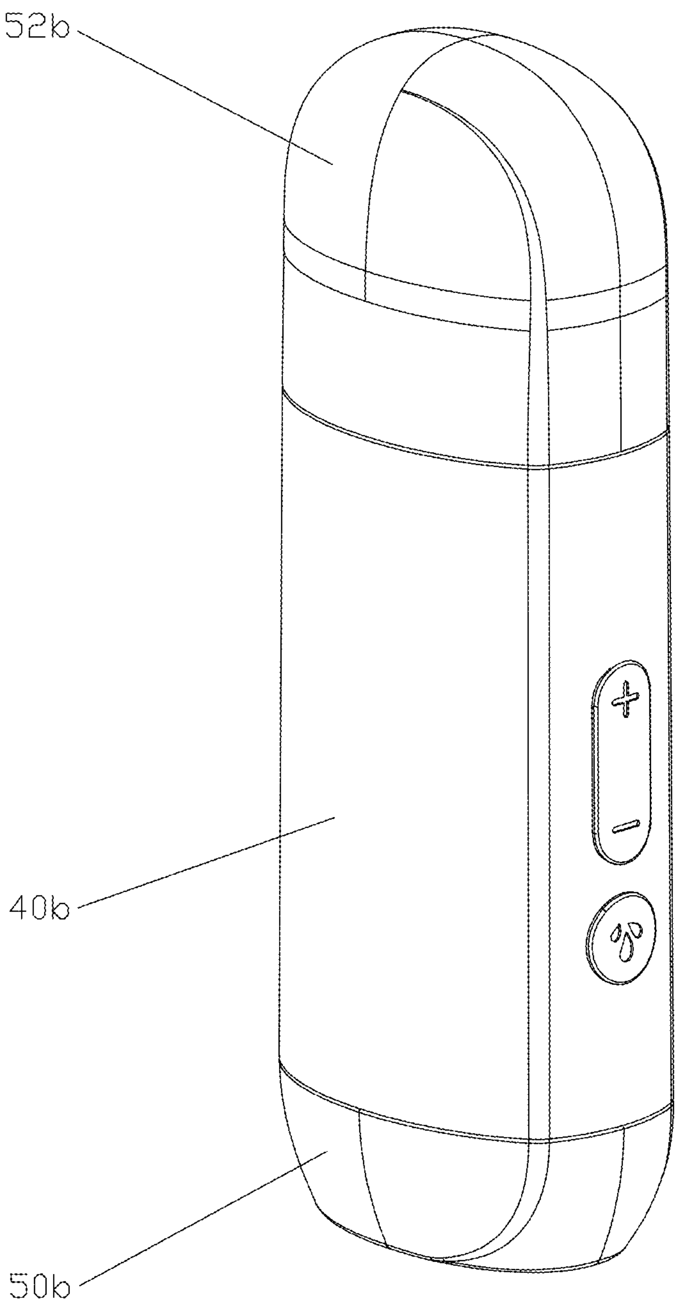
FIG. 17 is a cross sectional view of the portable liquid storage device of FIG. 16.

Referring to FIG. 16 and FIG. 17, a portable liquid storage device according to a third embodiment of the present application is shown. In this embodiment, the portable liquid storage device includes a heating cylinder assembly 11*b* and a pump assembly 30*a* connected to the heating cylinder assembly 11*b*.

The heating cylinder assembly 11*b* includes a cylindrical-shaped heat-conducting cylinder 113*b* for accommodating liquid therein and an annular electric-heating piece 112*b* mounted around and attached to an outer wall of the heat-conducting cylinder 113*b*. A battery 17*b* is electrically connected to the flexible electric-heating piece 112*b* through a circuit board 18*b*, so as to provide electric power to make the flexible electric-heating piece 112*b* generate heat to warm up the liquid inside the heat-conducting cylinder 113*b*.

In this embodiment, the pump assembly 30*a* includes an air pump 32*b* and pipelines for connecting the air pump 32*b* to the heat-conducting cylinder 113*b*. During operation, the air pump 32*b* supply air into the bottom end of the heat-conducting cylinder 113*b* to push the liquid in the heat-conducting cylinder 113*b* to move towards the top end, resulting in discharging of the liquid. Compared with the second embodiment, the piston plate is omitted.

In this embodiment, the heating cylinder assembly 11*b* is fixed inside a cylinder fixing sleeve 40*b*, a space is defined between the heating cylinder assembly 11*b* and the cylinder fixing sleeve 40*b* to receive the pump assembly 30*b*, the circuit board 18*b*, the battery 17*a*, and etc., wherein the battery 17*a* may be arranged above the air pump 32*b*, and the circuit board 18*b* may be arranged at a side opposite to the battery 17*a*. In this embodiment, the bottom end of the cylinder fixing sleeve 40*b* is configured to be open, facilitating assembly of this portable liquid storage device. A bottom cap 50*b* may be coupled to the bottom end of the cylinder fixing sleeve 40*b* to seal the cylinder fixing sleeve 40*b*.

In this embodiment, an air outlet 46*b* may be defined in a support base coupled to the bottom end of the heat-conducting cylinder 113*b* for interconnecting the air pump 32*b* to the heat-conducting cylinder 113*b*, and an air inlet may be defined in the cylinder fixing sleeve 40*b* or the bottom cap 50*b* for interconnecting the air pump 32*b* to the outside.

As shown in FIG. 17, the top end of the heat-conducting cylinder 113*b* is open, which may be regarded as a liquid injection hole for inputting liquid into the heat-conducting cylinder 113*b*. A bottle mouth 60*b* is coupled to the top end of the heat-conducting cylinder 113*b* and partly engaged into the liquid injection hole 49*b*. A liquid discharge hole 62*b* is defined in the bottle mouth 60*b* for discharging the liquid at an appropriate speed. Similarly, a top cap 52*b* may be coupled to the cylinder fixing sleeve 40*b* to cover the liquid discharge hole 62*b*.

Finally, it should be noted that: the above merely describes preferred embodiments of the present application without intention to limit the scope of the present application. Any modifications, equivalent replacements, improvements, and etc. made by those skilled in the art within the spirit and principle of the present application should be within the scope of the present application.

What is claimed is:

1. A portable liquid storage device, comprising:

a housing;

a heating cylinder assembly mounted in the housing, comprising a heat-conducting cylinder being configured for accommodating a liquid therein and an electric-heating piece attached to an outer wall of the heat-conducting cylinder, the heat-conducting cylinder comprising a first axial end and a second axial end that are opposite to each other;

an air pump mounted in the housing and connected to the first axial end of the heat-conducting cylinder, the air pump being configured for supplying air into the heat-conducting cylinder to push the liquid to move towards the second axial end of the heat-conducting cylinder; and a battery and a circuit board mounted in the housing, the battery being electrically connected to the electric-heating piece through the circuit board, so as to supply electric power to make the electric-heating piece generate heat to warm up the liquid inside the heat-conducting cylinder.

2. The portable liquid storage device according to claim 1, wherein the housing comprises a cylinder fixing sleeve mounted around the heating cylinder assembly and spaced from the the electric-heating piece of the heating cylinder assembly in a radial direction, and the air pump, the battery and the circuit board are arranged in a radial space defined between the cylinder fixing sleeve and the electric-heating piece of the heating cylinder assembly.

3. The portable liquid storage device according to claim 1, wherein a piston plate is slidably mounted inside the heat-conducting cylinder, and the air pump is configured for supplying air into the heat-conducting cylinder to push the piston plate to slide relative to the heat-conducting cylinder to push the liquid to move towards the second axial end of the heat-conducting cylinder.

4. The portable liquid storage device according to claim 1, wherein the housing comprises a cylinder fixing sleeve for receiving the heating cylinder assembly therein and a pump fixing sleeve for receiving the air pump, the battery and the circuit board therein, and the cylinder fixing sleeve and the pump fixing sleeve are arranged along an axial direction of the portable liquid storage device.

5. The portable liquid storage device according to claim 4, wherein the first axial end of the heat-conducting cylinder is an open end facing towards the pump fixing sleeve, a partition plate is provided between the cylinder fixing sleeve and the pump fixing sleeve to seal the open end of the heat-conducting cylinder, and an air outlet is defined in the partition plate for intercommunicating the air pump with the heat-conducting cylinder.

6. The portable liquid storage device according to claim 1, wherein the heat-conducting cylinder defines a liquid injection hole at the second axial end thereof, a bottle mouth is detachably connected to the second axial end of the heat-conducting cylinder to cover the liquid injection hole, and a liquid discharge hole is defined in the bottle mouth with a size less than that of the liquid injection hole.

7. The portable liquid storage device according to claim 1, wherein the portable liquid storage device is configured for supplying lubricating oil to adult products.

8. The portable liquid storage device according to claim 1, wherein the electric-heating piece is annular and flexible, and wrapped around an outer circumferential wall of the heat-conducting cylinder.

9. The portable liquid storage device according to claim 1, wherein a plurality of heat-conducting fins extends inwardly from an inner circumferential wall of the heat-conducting cylinder for transferring the heat of the electric-heating piece to the liquid at a central portion of the heat-conducting cylinder.

10. A portable liquid storage device, comprising:

a housing;

a heating cylinder assembly mounted in the housing, comprising a heat-conducting cylinder being configured for accommodating a liquid therein and an electric-heating piece attached to an outer wall of the heat-conducting cylinder;

an airbag being connected to and communicated with the heat-conducting cylinder; and a battery and a circuit board mounted in the housing, the battery being electrically connected to the electric-heating piece through the circuit board, so as to supply electric power to make the electric-heating piece generate heat to warm up the liquid accommodated inside the heat-conducting cylinder.

11. The portable liquid storage device according to claim 10, wherein a one-way valve is provided between the airbag and the heat-conducting cylinder.

12. The portable liquid storage device according to claim 11, wherein the heat-conducting cylinder comprises first and second open ends, a first sealing member is coupled to the first open end and defines a first through hole for suppling air from the air bag into the heat-conducting cylinder, and a second sealing member is coupled to the second open end and defines a second through hole for discharging of the liquid from the heat-conducting cylinder.

13. The portable liquid storage device according to claim 12, wherein the housing comprises a cylinder fixing sleeve mounted around the heating cylinder assembly and a flexible shell covered on the cylinder fixing sleeve, and a portion of the flexible shell extending beyond the cylinder fixing sleeve and the first open end of the heat-conducting cylinder acts as the airbag.

14. The portable liquid storage device according to claim 13, wherein a radial space is defined between the cylinder fixing sleeve and the heating cylinder assembly to accommodate the the battery and the circuit board therein, and a bottle mouth configured with a liquid discharge hole is coupled onto the second sealing member.

15. A portable liquid storage device, comprising:

a housing;

a heating cylinder assembly mounted in the housing, comprising a heat-conducting cylinder being configured for accommodating a liquid therein and an electric-heating piece attached to an outer wall of the heat-conducting cylinder, a liquid injection hole being defined in an end of the heating cylinder assembly;

a bottle mouth being detachably connected the housing to cover the liquid injection hole, a liquid discharge hole being defined in the bottle mouth with a size less than that of the liquid injection hole; and a battery and a circuit board mounted in the housing, the battery being electrically connected to the electric-heating piece through the circuit board, so as to supply electric power to make the electric-heating piece generate heat to warm up the liquid inside the heat-conducting cylinder.

16. The portable liquid storage device according to claim 15, further comprising an air pump or an airbag connected to another end of the heating cylinder assembly and communicated with the heat-conducting cylinder.

17. The portable liquid storage device according to claim 16, wherein the heat-conducting cylinder comprises first and second open ends, the air pump or airbag is provided at the first open end of the heat-conducting cylinder, and the liquid injection hole is provided at the second open end of the heat-conducting cylinder; and wherein the heating cylinder assembly further comprises a first sealing cover coupled to the first open end and defining a first through hole for suppling air from the air pump or airbag into the heat-conducting cylinder and a second sealing cover coupled to the second open end and defining a second through hole corresponding to the liquid injection hole, and the bottle mouth is coupled to the second sealing cover.

18. The portable liquid storage device according to claim 17, wherein the bottle mouth is partly engaged into the second through hole of the second sealing cover and the liquid injection hole of the heat-conducting cylinder.

19. The portable liquid storage device according to claim 17, wherein the housing comprises a cylinder fixing sleeve mounted around the heating cylinder assembly and a cap coupled onto the cylinder fixing sleeve, the battery and the circuit board are accommodated inside a radial space defined between the cylinder fixing sleeve and the heating cylinder assembly, and the cap seals the liquid discharge hole of the bottle mouth.

20. The portable liquid storage device according to claim 19, wherein the battery and the circuit board are arranged at two opposite sides of the heating cylinder assembly, respectively.

* * * * *